United States Patent [19]

Kysely

[11] 3,909,683

[45] Sept. 30, 1975

[54] CAPACITOR WITH OVERHEATING PROTECTION

[75] Inventor: Zdenek Kysely, Aldingen, Germany

[73] Assignee: Robert Bosch G.m.b.H., Stuttgart, Germany

[22] Filed: June 13, 1974

[21] Appl. No.: 479,180

[30] Foreign Application Priority Data
July 19, 1973   Germany............................ 2336727

[52] U.S. Cl.................. 317/247; 317/256; 317/260
[51] Int. Cl.² ........................................ H01G 4/40
[58] Field of Search..................... 317/247, 256, 260

[56] References Cited
UNITED STATES PATENTS
3,185,905   5/1965   Sternbeck............................ 317/260
3,573,565   4/1971   Grunert .............................. 317/256

Primary Examiner—E. A. Goldberg
Attorney, Agent, or Firm—William R. Woodward

[57] ABSTRACT

Reliable disconnection of at least one lead wire in case of failure in the capacitor winding is obtained by providing a cavity adjacent one or both of the vapor-deposited contact bridges at the ends of the capacitor winding. Reliability of disconnection in response to pressure is increased by reinforcing the contact bridges with a layer of resin and, further, by a metal disk embedded in the resin layer. The same hollow spaces are usable for disposing a fusible portion of one of the lead wires for disconnection under overcurrent conditions.

7 Claims, 7 Drawing Figures

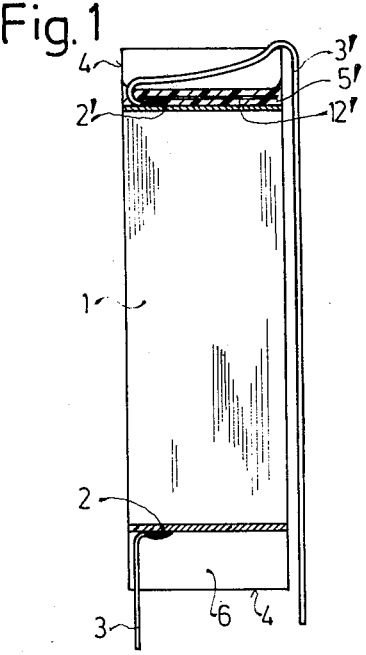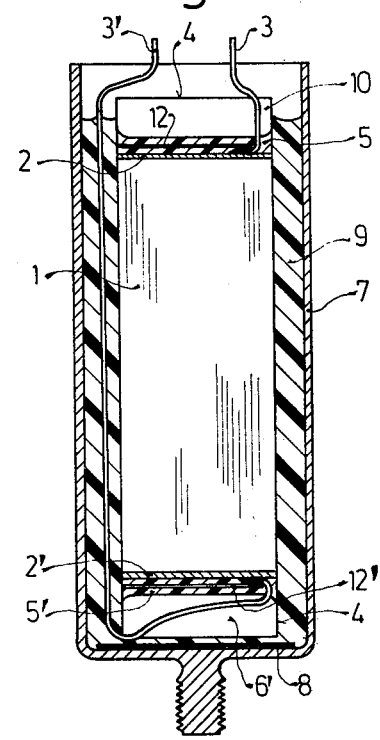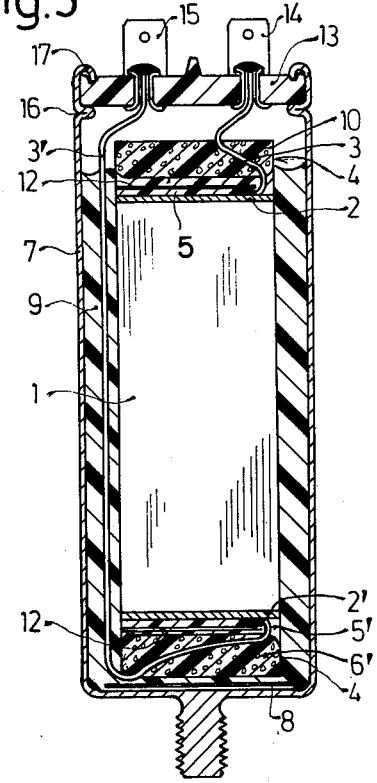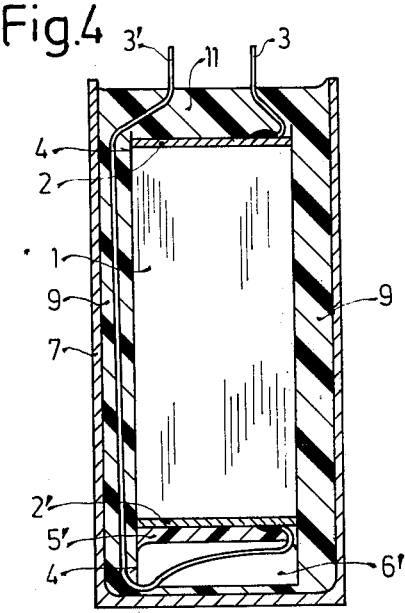

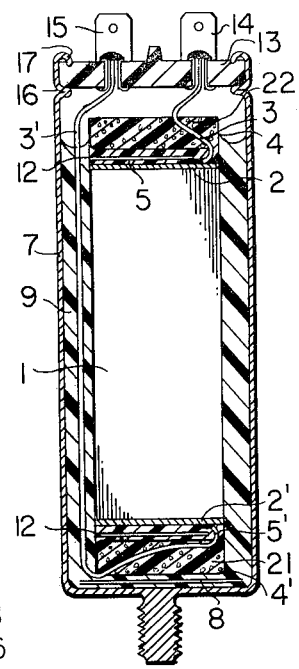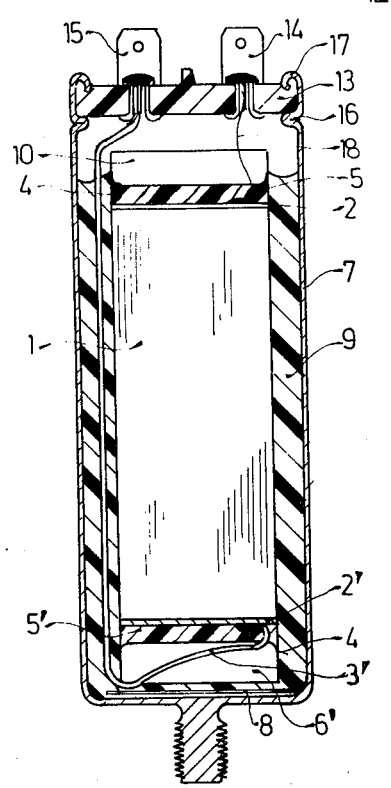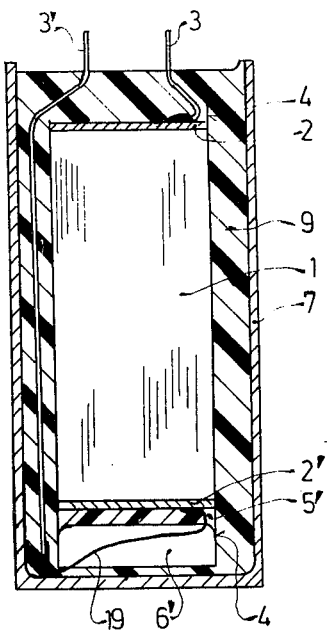

ated by 180° so that the lead wires 3 and
CAPACITOR WITH OVERHEATING PROTECTION This invention relates to electrical capacitors of the type comprising wound electrode and dielectric layers forming a cylindrical body, metallic contact bridges on the end faces of the electrode winding body and a disconnecting device responsive to internal over-pressure, all imbedded in synthetic material within a casing.

In a known capacitor of this type, the electrode and dielectric layer winding is made with a synthetic resin material that shrinks in the axial direction with an increase in temperature and the contact bridges are connected more firmly to the encasing synthetic material covering than to the end surfaces of the capacitor winding, so that when the winding shrinks axially, the contact bridges are torn from its end faces and the current supplied to the capacitor is interrupted, thus providing the desired disconnection under conditions generating internal pressure. Only particular kinds of synthetic resin material can be used for such a capacitor winding, and the selected material must also be subjected to preliminary treatment, in order to obtain the aforesaid axial shrinking when the device is heated. Such a device is accordingly usable only in a few applications and, in any case, is associated with substantial costs of production.

It is an object of the present invention to provide a capacitor of the general type above first described in which there are provided, at small additional cost, rapid and secure circuit breaking means when an internal over-pressure occurs in the capacitor winding and, furthermore, in which the means so provided produce no significant damage or distortion of the capacitor casing before, during or after such a circuit-breaking operation.

SUBJECT MATTER OF THE PRESENT INVENTION

Briefly, a yielding hollow space is provided in the surrounding synthetic resin material in the neighborhood of at least one end face of the capacitor winding body between the adjacent contact bridge and the facing end of the capacitor casing. With this construction, the effect is obtained that when an over-pressure arises inside the capacitor winding, at least one contact bridge is separated from the winding, thus interrupting the current supply.

Two arrangements have been found particularly useful for providing the hollow spaces in front of the end contact bridges of the capacitor winding. One of these is the application of one or more pieces or masses of foamed material in the places to be kept free of the embedding synthetic resin material (potting compound) and the other is the formation of an air inclusion in the form of an air pocket in the potting compound, preferably by the provision of a sleeve-like foil or other web tightly surrounding the capacitor winding and overlapping the end thereof. When the capacitor winding equipped with such an overlapping sleeve is inserted in a capacitor housing filled with unhardened synthetic resin, or when there is inserted in an empty capacitor casing in which synthetic resin is then injected, an air inclusion remains in the form of a cavity in front of the contact bridge.

It has been found that the reliability of the disconnection function, i.e., the trouble-free release of the contact bridge, can be further improved if the side of the contact bridge facing the hollow space is covered with a layer of synthetic resin material and, if desired, further provided with a stiffening disc embedded in the coating for increasing the stiffness of the bond between the contact bridge and the synthetic coating.

It is furthermore advantageous, in the case of a capacitor with lead wires electrically and mechanically affixed respectively to the contact bridges, to pass these lead wires from the contact bridges immediately through the hollow spaces in front of the contact bridges and only thereafter into synthetic resin material in which they become anchored. In this manner, the effect is obtained that the removal of the contact bridges is not hindered by the lead wires.

The invention is further described by way of example with reference to the accompanying drawings, in which:

FIG. 1 shows, partly in cross-section, a capacitor winding surrounded by a sleeve-like foil;

FIG. 2 is a cross-section of a capacitor winding of the form of FIG. 1 set in a cup-shaped sheet metal casing and subsequently potted with synthetic resin;

FIG. 3 is a cross-section a capacitor corresponding to FIG. 2 after the addition of a cover carrying terminal lugs;

FIG. 4 is a cross-section of a capacitor winding seated in a casing and provided with a hollow space at one end, adjacent the housing bottom;

FIG. 5 is a cross-section of a capacitor similar to that of FIG. 3 in which an upper lead wire includes a fuse segment;

FIG. 6 is a capacitor corresponding to FIG. 4 in which the lead wire affixed to the lower contact bridge is provided with a fusible segment, and FIG. 7 is a cross-section of a capacitor similar to FIG. 3 in which the hollow spaces of the FIG. 3 device are sub-divided into a multiplicity of small voids by a foam filling.

In FIG. 1 is shown a cylindrical capacitor winding 1 provided with so-called self-healing vapor-deposited metal layers on paper or synthetic resin strips wound together in the usual way. The two end surfaces of the winding have metallic contact bridges 2 and 2' sprayed on and lead wires 3 and 3' are respectively affixed electrically and mechanically to these contact bridges by soldering, brazing or spot-welding. Each contact bridge, of course, makes contact with only one of the metallic electrode layers of the capacitor winding.

The capacitor winding is surrounded by a tightly adjacent sleeve-like foil 4 of insulating material that extends beyond both end surfaces of the capacitor winding. A layer 5' about 1 mm thick of a hardened molding resin, for example, epoxy resin, is applied to the contact bridge 2' and adheres firmly both to the contact bridge and to the lead wire 3' and provides an air-tight seal between a cavity 6' and the surface of the capacitor winding body and similarly between the cavities 6' and 6. The hollow space 6' should have a minimum dimension in the axial direction of about 3 mm, and its minimum volume is to be determined by the maximum permissible over-pressure within the casing 7, within which this hollow space is located.

FIG. 2 shows the capacitor winding 1 seated in the casing 7, the representation of the capacitor winding having been rotated by 180° so that the lead wires 3 and 3' extend upward and the hollow space 6' is disposed below at the bottom of the metallic pot or cup-shaped casing. The empty space remaining around the capacitor winding 1 within the casing 7 is filled with a molding compound 9 which is then allowed to harden, after which it holds the winding securely in position and protects it from all kinds of external influences. The hollow space 6 above the contact bridge 2 is like the hollow space 6' lined in the same manner and to the same extent with a layer 5 of the same molding compound which is used to fill the space between the winding and the casing.

The effective residual cavity remaining from the original hollow space 6, between the surface of the layer 5 and a casing cover to be applied later is designated 10. Because of its air cushion, the hollow space 6', situated below, is preserved. Only enough molding compound to establish a pressure equililbrium can be introduced. The sequence of the above-named process steps for the manufacture of the capacitor does not have to be as above set forth. For example, it would be possible first to introduce the molding compound 9 into the casing 7 and then to insert the winding, previously coated with the layer 5, into the still fluid molding resin.

As may be seen from FIGS. 1 and 2, a disc 12 can be embedded in the layer 5, and likewise a disc 12' in the layer 5', for increasing the stability of the combination of the sprayed-on bridges 2, 2' and the reinforcing layers 5 and 5', respectively. The discs 12 and 12' are preferably of metal.

FIG. 3 shows a capacitor completed by a closure provided by a cover 13. Connection lugs 14 and 15 are fastened by hollow rivets onto the cover. The lead wires 3 and 3' pass through the rivets and are soldered fast to the bases of the respective lugs. The cover 13 rests on a bead 16 against which it is pressed by the crimped edge 17 of the casing.

The means for disconnecting a capacitor in response to internal over-pressure accordingly consist of the provision adjacent at least one of the end faces of the capacitor winding of a hollow space 6' or 10 that permits a displacement and breaking free of the contact bridge 2 or 2' from the capacitor winding end face. In order to obtain a complete breaking away of the contact bridge, i.e., in order to increase the disconnection reliability, layers 5 and 5' of a molding resin are applied respectively to the contact bridges 2 and 2'. If a failure occurs in the interior of the winding, either the bridge 2', with its layer 5', or the bridge 2 with its layer 5 will be separated from the end surface of the winding and the metallized electrode layers of the winding 1, as the result of internal overpressure. The current through the capacitor will thereby be interrupted (usually at one winding end surface, according to whether the position within the winding 1 where the failure occurs lies nearer to the contact bridge 2 or to the contact bridge 2'). The insertion of the disks 12, 12' serves for further stiffening of the combination of contact bridge and reinforcing layer to be split off the winding end surface, i.e. a further increase of the circuit breaking reliability.

FIG. 4 shows a capacitor in which the sleeve 4 extends beyond the winding 1 substantially only in the downward direction towards the bottom of the casing. After application of the layer 5, the insertion of the winding into the casing 7 and the filling with the potting compound 9, there arises in this construction only a single hollow space 6' adjacent the lower contact bridge 2'. At the other end of the winding 1 the potting compound fills the casing 7 up to its edge, and thus simultaneously provides the necessary closure for the completed capacitor.

The last mentioned construction is particularly advantageous for smaller capacitors, because the probability here is greater that overpressure resulting from failure in the winding 1 will seek relief simultaneously upwardly and downwardly. In this case, a reliable breaking off of one of the two contact bridges 2, 2' would no longer be accomplished if hollow spaces were present at both ends of the winding. By the reinforcement of the upper potting resin layer, i.e. by completely filling the potting resin up to the casing edge, a constraint is established that forces the internal overpressure to blow off only the lower winding bridge 2'. By these constructional changes there is obtained at the same time a reduction of a significant physical dimension of the capacitor and a considerable economy resulting from elimination of the casing cover and various related manufacturing steps. Upon the failure of the winding only the lower winding bridge 2' is broken off. The casting resin above the contact bridge 2 that replaces the cover 13 is designated 11 in FIG. 4.

FIGS. 5 and 6 show two capacitor constructions corresponding to those respectively shown in FIGS. 3 and 4, in which one of the connection wires between a contact bridge and a connection lug is replaced by a fusible wire connection.

In FIG. 5 the fuse segment is formed of a fusible wire 18 that replaces the lead wire 3 from the upper contact bridge 2 to the connection lug 14. In FIG. 6 a short piece of fusible wire 19 is soldered to the lower contact bridge 2' and led through the hollow space 6'. Its other end, which in the completed capacitor is embedded in the molding resin 9, is soldered to the shortened lead wire 3' which together with the lead wire 3 provides the external connections of the capacitor.

In cases in which the current through the capacitor at the time of failure of the capacitor winding 1 substantially exceeds the current rating of the capacitor, this supplemental provision of a fuse in a lead wire provides increased disconnection reliability at very small additional cost. Overcurrent protection of this type is in itself known and, accordingly, details thereof do not need to be further explained here. What is important in connection with the provision in accordance with the present invention for a disconnection in response to internal overpressure is simply that the hollow spaces present in the capacitor are used for positioning the fusible wires 18 and 19 respectively. Such overcurrent protection can actually not be embedded in the potting compound, because on the one hand the heat conduction would be too great for a reliable melting through of the wire and, at the same time, the separation of melting parts is made more difficult in confinement within the cast resin mass and hence the interruption of the current is made more difficult.

Instead of the hollow spaces 6 and 6' formed by simple inclusions, it is also possible to provide the hollow space by means of insertion of injection of a foam material. Such a capacitor, similar to that of FIG. 3, provided with foam fillings 21 and 22 respectively in place of the air spaces 10 and 6' of FIG. 3 is shown in FIG. 7. Preferably, foam material with closed pores is utilized that is embedded in the shape of the desired hollow spaces in the potting compound, so as to produce the necessary expansion space for internal overpressure and for breaking off one or both contact bridges.

Although the invention has been described with respect to particular embodiments, it will be understood that variations are possible within the inventive concept.

I claim:

1. An electrical capacitor of the type comprising wound electrode and dielectric layers forming a cylindrical body, metallic contact bridges on the end faces of said body for contact with the respective electrode layers, and a disconnecting device responsive to internal over-pressure, all of the foregoing being imbedded in a synthetic resin material within a casing for the assembly, which capacitor embodies the improvement that:

in the vicinity of at least one of said end faces of said cylindrical body a yielding hollow space is provided in the surrounding synthetic resin material between the adjacent metallic bridge and the facing end of said casing.

2. A capacitor as defined in claim 1 in which said hollow space is formed by an air inclusion within the end of a sleeve-like web tightly surrounding said cylindrical body and having an end overlapping the end of said body in the vicinity of the adjacent metallic contact bridge.

3. A capacitor as defined in claim 1 in which the contact bridge facing said hollow space is covered with a thin layer of synthetic resin material.

4. A capacitor as defined in claim 3 in which a stiffening disc is imbedded in said thin layer of synthetic resin material.

5. A capacitor as defined in claim 1 in which lead wires are respectively connected to said contact bridges and in which each lead wire that connects with a contact bridge adjacent a hollow space is positioned to pass freely through said hollow space.

6. A capacitor as defined in claim 5 in which a lead wire passing through a hollow space as aforesaid is formed, at least in part, of fusible material to provide a protective fuse.

7. An electrical capacitor of the type comprising wound electrode and dielectric layers forming a cylindrical body, metallic contact bridges on the end faces of said body for contact with the respective electrode layers, and a disconnecting device responsive to internal over-pressure, all of the foregoing being embedded in a substantially non-porous synthetic resin material within a casing for the assembly, which capacitor embodies the improvement that:

in the vicinity of at least one of said end faces of said cylindrical body a yielding foam filled space is provided in the surrounding aforesaid synthetic resin material between the adjacent metallic bridge and the facing end of said casing.

* * * * *